United States Patent Office 3,165,499
Patented Jan. 12, 1965

---

3,165,499
FILM AND PROCESS FOR MAKING SAME
Francis Peter Alles, Westfield, N.J., assignor to E. I. du Pont de Nemours and Company, Wilmington, Del., a corporation of Delaware
No Drawing. Filed Oct. 27, 1960, Ser. No. 65,257
6 Claims. (Cl. 260—75)

This invention relates to polymeric linear terephthalate ester films and, more particularly, to a process for producing the same. Still more particularly, it relates to such films which have enhanced physical properties.

This application is a continuation-in-part of application Serial No. 758,923, filed September 4, 1958, now abandoned, which, in turn, is a continuation-in-part of application Serial No. 629,455, filed December 20, 1956, now issued as U.S. Patent No. 2,884,663.

Polymeric linear terephthalate ester films which have been oriented by stretching are known to have excellent physical properties. For some uses of these films, however, wherein the films are in the form of tapes or ribbons, such as in magnetic recording tapes, metallic yarn, miscellaneous tapes, etc., such films are found to have certain undesirable characteristics including insufficiently high tensile strength and modulus (measure of stiffness) and too high residual elongation, particularly in the longer or longitudinal direction of the films.

An object of this invention, therefore, is to provide a polymeric linear terephthalate ester film having outstanding directional physical properties. Another object is to provide such a film in the form of a tape having improved tensile strength, modulus and elongation in the longitudinal direction. A further object is to provide such an improved tape having satisfactory dimensional stability and useful as a base support in magnetic recording films. A still further object is to provide a novel process for producing such an improved film. Yet another object is to provide such a process wherein the excellent physical properties of oriented polymeric linear terephthalate ester films are improved.

The objects of this invention are accomplished by stretching in one direction an amount sufficient to increase the tensile strength of the film (measured at 5% elongation) to at least 20,000 p.s.i. at a temperature of from about 20° C. to 205° C., and heat setting at a temperature of from about 150° to 235° C. under tension such that no shrinkage is permitted in the one direction of stretch, a polymeric linear terephthalate ester film which has been substantially uniformly oriented by stretching in both directions at an average temperature, $T_1$, at least 2.5× its initial dimensions and heat set at a temperature from at least 5° above the average stretching temperature, $T_1$, to about 20° C. below the melting point [1] of the terephthalate ester.

The resulting film will have an $F_5$ value [2] of at least 20,000 p.s.i. and a tensile strength at break of at least 30,000 p.s.i. in the direction of the one-directional stretch, an initial tensile modulus of at least 700,000 p.s.i. and an elongation at break of less than 100%, preferably no greater than 50% in the same direction. By practicing the process of this invention, films may be obtained having an $F_5$ value as high as 75,000 p.s.i., a unidirectional tensile strength as high as 113,000 p.s.i., and in the same direction a modulus of up to 1,500,000 p.s.i. The film is further characterized by having a thermal dimensional stability, i.e., dimensional stability at elevated temperatures, measured as hereinafter described, of less than 15% and, in the most preferred case, less than 10% for all temperatures up to about 30° C. below the second heat set temperature. An additional important property of the film is its ability to withstand at least 300 cycles per mil thickness in the stress-flex test.[3]

The outstanding properties of this film are most easily explained by the unique structure of the polyethylene terephthalate film of this invention. The film, upon being subjected to X-ray analysis, is shown to be composed of a complex network of molecular chains that pass through crystalline and amorphous regions. It is believed that the extent and the arrangement of the crystallites contribute to the film's strength, $F_5$ value and its dimensional stability. The flexibility, toughness and non-fibrillating qualities of the film are attributable to the nature and the amount of the amorphous regions.

Specifically, the extent of crystallization is measured by the density of the film. The density of the novel film of this invention is 1.37–1.40 grams/cubic centimeter when measured at a temperature of 25° C. Density values alone, however, can be misleading since they reflect not only the crystallinity of the film but also the voids in the film. The voids are introduced during stretching and their presence tends to indicate a lower density than actually exists. Hence, it is necessary to consider this density, which shall be called the "apparent density" of the film, in conjunction with other specifications for the crystalline and amorphous regions.

The size of the crystallites that make up the crystalline regions is one such important specification. The size of the crystallites is best characterized by the crystallite length. To measure this crystallite length, the breadth of a specific diffraction peak, i.e. the diffraction peak of the 105 plane, is used in the manner described in "X-Ray Diffraction Procedures," by Klug and Alexander, John Wiley and Sons (1954), New York. It is calculated from the equations:

$$L = \frac{k\lambda}{B_c \cosine \theta}$$

wherein:

$L$ = the average crystallite length in Angstrom units;
$\theta$ = the Bragg angle of the reflection;
$\lambda$ = the wave length of the X-radiation in Angstrom units;
$k$ = a shape factor that is unity for polyethylene terephthalate crystallites; and
$B_c$ = the corrected half maximum line breadth in radians and is determined from the following equation:

$$B_c^2 = B_0^2 - b_c^2$$

wherein:

$B_0$ = the measured half maximum line breadth and
$B_c$ = a correction for the instrument which is the width at half maximum intensity for a well crystallized material at about the same Bragg angle.

For the polyethylene terephthalate film of this invention, the average crystallite length is 50–75 Angstrom units, preferably 55–65 Angstrom units.

The length of the amorphous region is the length of the region between crystallites and must be measured indirectly. What is measured first is the distance between crystallite centers parallel to the direction of greater orientation. This distance is the so-called "long period spacing." It includes the amorphous length plus half of each of two crystallites. Assuming that the two crystallites are of equal length, then the long period spacing is equal to the sum of amorphous length and crystallite length.

---

[1] Melting point is the lowest temperature at which crystallites cannot be seen using a polarized light microscope when the temperature of a polymer sample is raised gradually from room temperature.
[2] Tensile strength measured at 5% elongation.
[3] The stress-flex test is a quantitative mechanical method for determining the resistance of a film to fibrillation, i.e. the higher the stress-flex value the greater the resistance to fibrillation.

The long period spacing is determined from the low angle X-ray diffraction which diffraction originates from the periodic spacing of the crystallites. Specifically, the X-radiation is projected along the edge of a film sample, i.e. normal to the direction of greater orientation, in a vacuum camera and the diffraction patterns obtained are photographed. The X-radiation used in the tests described in the present application was CuKα radiation having a wave length of 1.54 Angstrom units and the thickness of the film samples used was 0.20″. From the diffraction patterns obtained, the distance between diffraction peaks (the long period spacing) is calculated using the Bragg equation:

$$d = \frac{n\lambda}{2 \sin \theta}$$

wherein:

$d$ = the long period spacing;
$n$ = 1, the order of diffraction;
$\lambda$ = 1.54 Angstrom units; and
$\theta$ = the Bragg angle.

The amorphous length is then determined by subtracting the average crystallite length (L) from the long period spacing ($d$). For the films of this invention, the long period spacing ranges from 125 to 160 Angstrom units, preferably 130–150 Angstrom units, and the amorphous lengths are all above 65 Angstrom units but usually no greater than 110 Angstrom units.

Another important characteristic of the microscopic, internal structure of the film of this invention is related to the distribution of the long axes of the crystallites. For the outstanding properties of the film of this invention, it is important that the distribution of these long axes in the directions of greater and lesser orientation approach a random distribution, i.e. approach the point where as many are distributed in the direction of greater orientation as are distributed in the direction transverse to the direction of greater orientation as are distributed in the directions intermediate between the two extreme directions. To determine this distribution, X-radiation is projected on an edge of a film sample and the sample is rotated in the plane that includes all the edges of the film through an angle of 90°. The X-ray intensity passing through the film is measured at 5° intervals from 0 to 90° by means of a Single Crystal Orienter coupled to a proportion counter, the angle of 0° being in the direction of greater orientation and the angle of 90° being in the direction transverse to the direction of greater orientation. To obtain the angle that represents the overall distribution of the long axes of the crystallites, a weighted average of the X-ray intensities over the area of rotation is used. A 45° angle would represent a purely random distribution of the crystallite axes. For the film of the present invention, the angle representing the distribution of the long axes, hereinafter called angle "α," should approach 45° and be no less than about 30°, i.e. fall between 30° and 45°.

Thus, the novel polyethylene terephthalate films of the present invention, which may be said to display a unique taut amorphous structure coupled with appreciable transverse directional orientation, should have the following structural characteristics:

(1) An apparent density of 1.37–1.40 grams/cc. at 25° C.
(2) An average crystallite length of 50–75 Angstrom units.
(3) A long period spacing of 125–160 Angstrom units.
(4) An amorphous length of 65–110 Angstrom units.

And preferably a fifth characteristic:

(5) A distribution of long axes of the crystallites of 30°–45°.

Such a product is obtained by the previously described process as well as those processes to be described subsequently.

In one important aspect, particularly adapted for relatively thick films and continuous operation, the process of this invention comprises stretching in one direction 1.15X–4.0X, preferably from about 1.4X to about 2.0X, at a temperature of from about 80° C. to 205° C., and heat setting at a temperature of from about 150° C. to 235° C. under tension sufficient to prevent shrinkage in the direction of stretch, a polymeric linear terephthalate ester film which has been substantially uniformly oriented by stretching in both directions 2.5X–5.0X, preferably about 3.0X, its initial dimensions at a temperature of about 80° C. to 120° C. and heat set at a temperature of from about 150° C. to 205° C.

The preferred film which is the subject of this invention is polyethylene terephthalate as disclosed in Whinfield and Dickson U.S. Patent No. 2,465,319. The polyethylene terephthalate may be prepared by the condensation of ethylene glycol and terephthalic acid or preferably by an esterification reaction between ethylene glycol and an ester forming derivative of terephthalic acid, such as a dialkyl terephthalate, e.g. dimethyl terephthalate and polymerizing the monomeric reaction product. Films of such materials may be prepared by extruding the molten amorphous polymer through a narrow orifice.

It is to be understood, however, that the present invention comprehends films of any synthetic linear terephthalate ester polymer derived by reacting a glycol selected from the group having the formula $HO(CH_2)_nOH$ where $n$ is an integer from 2 to 10 inclusive, terephthalic acid or an ester forming derivative thereof or a low molecular weight alkyl ester thereof, and from 0–35% by weight of a second acid or ester thereof, said second acid being selected from the group which includes isophthalic acid, bibenzoic acid, sebacic acid, hexahydroterephthalic acid, adipic acid, azaleic acid, naphthalic acid, 2,5-dimethyl terephthalic acid and bis-p-carboxy phenoxy ethane.

In a preferred embodiment, particularly adapted for continuous high speed operation, the process of this invention comprises stretching in one direction from about 1.4X to about 2.0X, at a temperature of from about 140° C. to 205° C., and preferably from about 180° C. to 200° C., and heat setting at a temperature of from about 150° C. to 220° C. and preferably from about 190° C. to 200° C. under tension such that no shrinkage is permitted in the direction of stretch during heat setting, a polyethylene terephthalate film which has been substantially uniformly oriented by stretching in both directions about 3.0X its initial dimensions at a temperature of from about 80° C. to 120° C. and heat set at a temperature of from about 180° C. to 200°C.

As used herein, tensile strength is intended to mean the amount of pull or directional force per unit area, conveniently expressed in pounds per square inch (p.s.i.), which is required to break the film at room temperature. Initial tensile modulus, also expressed in p.s.i., is the slope of the stress-strain curve at an elongation of 1% as the film is being elongated at a rate of 100% per minute and is a measure of bend and stiffness. Elongation is the extent to which a film will stretch before breaking upon being subjected to unidirectional tension at room temperature at a constant rate of 100% per minute.

The process of this invention has been found to impart to the film a satisfactory dimensional stability at elevated temperatures. This property is referred to as "thermal dimensional stability" and is a measure of the ability of the film to resist shrinkage at elevated temperatures. A measurement of thermal dimensional stability may be obtained by hanging an otherwise unrestrained sample of the film of known dimensions (10 inches x 10 inches) in an oven at a known elevated temperature for a given time, measuring the new dimensions and expressing the difference in dimensions over the original dimensions as a percent shrinkage. For consistent measurements, the elevated temperature used should be about 30° C. below the second heat set temperature or lower. For example, for a film sample which has been unidirectionally stretched and heat set at 205° C. according to this invention, measurements obtained after the film hung as described for 30 minutes at about 175° C. indicate a thermal dimensional stability of less than 10%. For a second film sample stretched, and heat set at 150° C., according to this invention, measurements obtained after the film hung as described for 30 minutes at about 120° C. indicate a thermal dimensional stability of less than 2%. For films to be used as base films for recording tapes, the shrinkage at 60° C. seems to be the critical consideration. The films produced according to the present invention exhibit a thermal dimensional stability of less than 1% shrinkage at 60° C. making them particularly suited for this use in recording tapes.

The above mentioned improvements are attained without causing the film to fibrillate, i.e. without causing the occurrence of intolerable small lengthwise splits in the film, an achievement not possible when amorphous terephthalate ester films are unidirectionally stretched about 4.5X–5.0X.

The invention will be further illustrated but is not intended to be limited by the following examples.

*Examples 1 Through 16*

An initially amorphous polyethylene terephthalate film which had been oriented by stretching approximately 3X in both directions as described in Scarlett United States Patent Number 2,823,421, filed May 12, 1952, and had been heat set (after biaxial stretching) at a temperature of about 200° C., was stretched unidirectionally in accordance with the process of this invention. The apparatus used comprised a nip roll web stretcher of two sets of differentially driven pull rolls. The first set of rolls included a radiantly heated top roll covered with silicone rubber and an inductively heated metal coated bottom roll. The second set of rolls included a neoprene covered top roll and a metal plated bottom roll. The amount of stretch was controlled by varying the differential speeds of the two sets of rolls in amounts to effect a longitudinal (machine direction) stretch of between 1.4X and 2.0X based on the dimensions of the previously oriented film. The conditions for each example were as follows:

| Example | Peripheral Roll Speed | | Stretch Ratio | Stretch Temperature (° C.) | Heat Set Temperature (° C.) |
|---|---|---|---|---|---|
| | 1st Set of Rolls (yards/min.) | 2nd Set of Rolls (yards/min.) | | | |
| 1 | 1.4 | 2.4 | 1.70X | 110 | 160 |
| 2 | 27.0 | 40.0 | 1.49X | 125 | 170 |
| 3 | 27.0 | 40.0 | 1.49X | 145 | 180 |
| 4 | 27.0 | 40.0 | 1.49X | 160 | 190 |
| 5 | 27.0 | 40.0 | 1.49X | 165 | 200 |
| 6 | 27.0 | 40.0 | 1.49X | 175 | 195 |
| 7 | 24.5 | 37.5 | 1.53X | 200 | 230 |
| 8 | 26.0 | 46.5 | 1.79X | 195 | 225 |
| 9 | 25.0 | 46.5 | 1.89X | 192 | 225 |
| 10 | 33.0 | 64.2 | 1.92X | 192 | 220 |
| 11 | 46.7 | 90.0 | 1.94X | 192 | 230 |
| 12 | 31.5 | 63.0 | 1.98X | 192 | 235 |

In four additional examples, samples of film described as the starting film in the preceding examples were unidirectionally stretched on an Instron tensile testing machine (referred to hereinbelow) and heat set under the following conditions:

| Example | Stretch Ratio | Stretch Temperature (° C.) | Heat Set Temperature (° C.) |
|---|---|---|---|
| 13 | 1.75X | 22 | 155 |
| 14 | 1.75X | 22 | 150 |
| 15 | 1.60X | 21 | 150 |
| 16 | 1.45X | 21 | 150 |

A sample of oriented film which was not subjected to the unidirectional stretch as a control and the films of each sample were tested with the following results:

| Example | Longitudinal Tensile Strength (p.s.i.) | Longitudinal Modulus (p.s.i.) | Longitudinal Elongation (Percent) | $F_5$ Value (p.s.i.) | Stress-Flex (cycles/mil) | |
|---|---|---|---|---|---|---|
| | | | | | L.D. | T.D. |
| Control | 22,008 | 680,000 | 75.00 | 15,000 | 1,130 | 985 |
| 1 | 33,500 | 704,415 | 11.00 | 20,000 | 476 | 503 |
| 2 | 33,222 | 901,575 | 16.40 | 25,000 | 390 | 445 |
| 3 | 32,126 | 874,855 | 19.18 | 24,000 | 542 | 494 |
| 4 | 38,437 | 918,805 | 24.60 | 28,000 | 455 | 410 |
| 5 | 34,737 | 946,559 | 34.10 | 25,500 | 510 | 476 |
| 6 | 30,734 | 747,761 | 20.21 | 21,000 | 508 | 533 |
| 7 | 34,560 | 854,554 | 24.39 | 20,000 | 416 | 385 |
| 8 | 32,725 | 760,614 | 21.60 | 25,500 | 600 | 572 |
| 9 | 34,868 | 962,404 | 14.91 | 26,500 | 475 | 468 |
| 10 | 35,500 | 990,191 | 13.34 | 20,000 | 531 | 502 |
| 11 | 36,894 | 937,765 | 12.35 | 28,000 | 552 | 531 |
| 12 | 39,068 | 1,011,573 | 10.77 | 30,000 | 460 | 465 |
| 13 | 38,390 | 730,045 | 40.20 | 20,000 | 584 | 515 |
| 14 | 35,400 | 705,895 | 36.00 | 20,000 | 415 | 421 |
| 15 | 31,200 | 722,200 | 38.00 | 20,000 | 636 | 540 |
| 16 | 31,560 | 719,238 | 40.00 | 20,000 | 581 | 537 |

The thermal dimensional stability of the unidirectionally stretched film of each of the preceding examples was, by the heat setting step of the process of this invention, reduced from residual shrinkages ranging from 20% to 40% down to less than 10%, as was shown by measurements obtained as hereinbefore described, on samples hung for 30 minutes at temperatures about 30° C. below the tabulated heat set temperature and down to less than 1% measured at 60° C.

The humidity coefficient of the unidirectionally stretched film was improved in the direction of stretching by more than a factor of 2. For example, a typical film sample having a humidity coefficient of 0.0000085 inch/inch/1% relative humidity was improved to a humidity coefficient in the direction of stretching to 0.0000037 inch/inch/1% relative humidity.

The temperature coefficient of the unidirectionally stretched film was improved in the direction of stretching by a factor of about 10. For example, a typical film sample having a temperature coefficient of 0.000020 inch/inch/1° F. was improved to a temperature coefficient in the direction of stretching to 0.0000019 inch/inch/1° F.

The structural characteristics of the films of each example compared to the control are presented in the following table:

| Example | Apparent Density at 25° C. (gms./cc.) | Crystallite Length (A.) | Long Period Spacing (A.) | Amorphous Length (A.) | Angle "α" (degrees) |
|---|---|---|---|---|---|
| Control | 1.3930 | 57 | 119 | 62 | 47.5 |
| 1 | 1.3889 | 61 | 129 | 68 | 39.6 |
| 2 | 1.3908 | 63 | 131 | 68 | 36.3 |
| 3 | 1.3932 | 58 | 130 | 72 | 33.3 |
| 4 | 1.3895 | 56 | 134 | 78 | 31.6 |
| 5 | 1.3928 | 62 | 132 | 70 | 37.0 |
| 6 | 1.3940 | 58 | 131 | 73 | 38.7 |
| 7 | 1.3919 | 56 | 131 | 75 | 34.1 |
| 8 | 1.3936 | 62 | 133 | 71 | 32.6 |
| 9 | 1.3948 | 59 | 134 | 75 | 33.7 |
| 10 | 1.3929 | 60 | 131 | 71 | 32.1 |
| 11 | 1.3962 | 56 | 136 | 80 | 35.5 |
| 12 | 1.3948 | 64 | 138 | 74 | 31.0 |
| 13 | 1.3900 | 55 | 132 | 77 | 36.6 |
| 14 | 1.3916 | 57 | 132 | 75 | 32.5 |
| 15 | 1.3914 | 61 | 127 | 66 | 38.0 |
| 16 | 1.3898 | 56 | 133 | 77 | 39.7 |

*Example 17*

Utilizing a uniformly oriented polyethylene terephthalate film, which had been heat set at 200° C. after orientation and stretching apparatus as in the preceding examples, a unidirectional stretch was applied to an amount of 1.6X at a temperature of about 100° C. while allowing a width reduction of the film of about 35%. The film was then heat set at about 190° C. while restrained from longitudinal shrinkage. The resultant film was compared with a control sample which had not received the unidirectional stretch. The tensile strength of the improved film of this example was 35,000 p.s.i. in the direction of stretch whereas that of the control sample was only 22,000 p.s.i. The $F_5$ value was 20,000 p.s.i. compared to a control of 14,500 p.s.i. The modulus in the same direction had increased from 680,000 to 920,000 p.s.i. Elongation was reduced from 75% to 30% in the same direction. Tear strength had increased in the transverse direction 5.25 times from 20 to 105 grams per mil, while increasing in the direction of stretch 2.25 times from 20 to 45 grams per mil. Thermal dimensional stability was measured to be 6% after 30 minutes at 150° C. The stress-flex values were 377 in the direction of additional stretch and 359 in the transverse direction. The film had an apparent density at 25° C. of 1.3914 gms./cc.; a crystallite length of 58 Angstrom units; a long period spacing of 143 Angstrom units; an amorphous length of 85 Angstrom units; and an angle "$\alpha$" of 37.1 degrees.

*Example 18*

An essentially amorphous polyethylene terephthalate film having an initial thickness of about 0.009″ was stretched sequentially in two mutually perpendicular directions in accordance with the general process described in U.S. Patent 2,823,421 to A. C. Scarlett. The film was stretched first in its longitudinal direction over a series of stretching rolls maintained at a temperature in the range of 80°–90° to an extent of 3X (where X equals its original dimension). This film was then stretched to about 3X in a direction transverse to the longitudinal direction in a tentering apparatus wherein the atmosphere surrounding the film was in the range of about 80°–95° C. After biaxial stretching, the film was heat set while being held under tension to restrict shrinkage in either direction of stretch at a temperature of about 200° C.

The biaxially stretched, heat set film was then further stretched in the longitudinal direction using the nip roll stretching apparatus described in the preceding examples. The first set of nip rolls will be referred to as the "slow nip" and the second set of nip rolls will be referred to as the "fast nip." The relative speeds and temperatures of each of the rolls in each set is tabulated in the following table:

|  | Slow Nip | Fast Nip |
|---|---|---|
| Speed in yards per minute | 37.5 | 60.0 |
| Metal roll surface temperature (° C.) | 202 | 207 |
| Rubber roll surface temperature (° C.) | 191 | 202 |

The film was longitudinally stretched in the nip roll stretching apparatus to an extent of about 1.6X (where X equals the longitudinal dimension of the film prior to entering the slow nip roll set).

The longitudinally stretched film was heat set as it passed through the fast nip rolls, the temperature of heat setting being within the range of 200°–205° C. The physical properties and the structural characteristics of the film before and after stretching 1.6X in the nip roll stretching apparatus are tabulated below:

|  | Before | After [1] |
|---|---|---|
| Thickness (inch) | .001 | .00063.[2] |
| $F_5$ value (p.s.i.) | 14,000 | 2,00. |
| Tensile strength (p.s.i.) | 21,000 | 34,000. |
| Modulus (p.s.i.) | 550,000 | 780,000. |
| Elongation (percent) | 110 | 23. |
| Thermal stability (percent) | 3.0% at 170° C | 14% at 170° C. |
| Stress-flex (cycles/mil) |  | 570 (522 in transverse direction). |
| Apparent density (gms./cc.) |  | 1.3930.[2] |
| Crystallite length (A.) |  | 57. |
| Long period spacing (A.) |  | 130. |
| Amorphous length (A.) |  | 73. |
| Angle "$\alpha$" (degrees) |  | 35.9.[2] |

[1] In the longitudinal direction.
[2] Independent of direction.

*Example 19*

An essentially amorphous polyethylene terephthalate film having an initial thickness of about 0.006″ was biaxially stretched in accordance with the general process described in U.S. Patent 2,823,421 to A. C. Scarlett. The film was first stretched in a longitudinal direction to an extent of about 3.1X over a series of stretching rolls at a temperature in the range of 80°–90° C., and thereafter the film was stretched in a direction transverse to the first direction of stretch to an extent of about 3.0X in a tentering apparatus wherein the temperature was maintained within the range of 80°–90°. The film was then heat set under tension to prevent shrinkage in either direction of stretch at a temperature of 96° C.

The above biaxially stretched heat set film was stretched further in the longitudinal direction using a nip roll stretching apparatus of the type described previously. The film was first fed through a bank of slow rolls at a speed of 30 yards/minute, the rolls being maintained at a temperature of about 80° C. Next, the film passed into slow nip rolls, rotating at 30 yards/minute and maintained at about 90° C. The fast nip rolls, rotating at 40.5 yards/minute, were maintained at a temperature of about 65° C. The film was passed from the fast nip rolls into a tentering apparatus wherein the film temperature was raised at intervals in the tentering apparatus to an ultimate heat setting temperature at 165° C. During passage through the tenter frame the film was maintained under longitudinal tension to prevent shrinkage in the longitudinal direction while tension in the transverse direction was maintained to prevent any appreciable shrinkage in the transverse direction. The resulting film was stretched to an extent of 1.35X (where X equals the longitudinal dimension of the film prior to entering the nip roll stretching apparatus).

The physical properties and the structural characteristics of the film before and after stretching 1.35X in the nip roll stretching apparatus are tabulated below:

|  | Before | After [1] |
|---|---|---|
| Thickness (inch) | .00065 | .00062.[2] |
| $F_5$ value (p.s.i.) | 12,900 | 21,300. |
| Tensile strength (p.s.i.) | 33,000 | 45,400. |
| Modulus (p.s.i.) | 478,000 | 797,000. |
| Elongation (percent) | 96 | 50. |
| Thermal stability (percent) | 23% at 200° C | 8% at 150° C. |
| Stress-flex (cycles/mil) |  | 554 (500 in transverse direction). |
| Apparent density (gms./cc.) |  | 1.3843.[2] |
| Crystallite length (A.) |  | 56. |
| Long period spacing (A.) |  | 129. |
| Amorphous length (A.) |  | 73. |
| Angle "$\alpha$" (degrees) |  | 34.1. |

[1] In the longitudinal direction.
[2] Independent of direction.

*Examples 20–23*

In these examples, an essentially amorphous polyethylene terephthalate film which had been stretched about 3X in each of two mutually perpendicular directions at a temperature within the range of 80–95° C. and then heat set at about 200° C., was subjected to further longitudinal stretching in a nip roll stretching apparatus of the type described hereinbefore. In these examples, stretching was carried out at essentially the same temperature as the temperature of final heat setting, the heat setting step being effected essentially simultaneously with stretching.

The following table indicates and tabulates the conditions under which stretching and heat setting were carried out for each example:

| Example | Peripheral Roll Speed (y.p.m.) | | Stretch Ratio | Stretching Temp. (° C.) | Heat Set Temp. (° C.) |
| --- | --- | --- | --- | --- | --- |
| | Slow Rolls | Fast Rolls | | | |
| 20 | 31.6 | 61 | 1.93 | 204 | 204 |
| 21 | 30.3 | 58.3 | 1.92 | 199 | 199 |
| 22 | 31.6 | 61 | 1.93 | 199 | 199 |
| 23 | 31 | 60 | 1.935 | 198 | 198 |

The physical properties of the films produced are tabulated below:

| Ex. | Direction | Thickness (in.) | Tensile Strength (p.s.i.) | $F_5$ Value (p.s.i.) | Elongation (percent) | Modulus (p.s.i.) | Thermal Dimensional Stability, Shrinkage [1] in percent at 170° C. | Stress-Flex (cycles per mil) |
| --- | --- | --- | --- | --- | --- | --- | --- | --- |
| 20 | LD | 0.00063 | 43,175 | 31,600 | 20.2 | 1,056,300 | −8 | 352 |
|    | TD | 0.00063 | 13,873 |        | 116.2 | 419,780 | +1 | 475 |
| 21 | LD | 0.00058 | 37,400 | 26,200 | 16.0 | 872,881 | −9.5 | 471 |
|    | TD | 0.00060 | 14,429 |        | 120.8 | 429,058 | +1 | 410 |
| 22 | LD | 0.00060 | 40,821 | 30,800 | 13.6 | 964,895 | −8.5 | 354 |
|    | TD | 0.00060 | 15,335 |        | 111.4 | 445,621 | +1 | 438 |
| 23 | LD | 0.00060 | 45,923 | 31,000 | 16.6 | 1,008,030 | −8 | 580 |
|    | TD | 0.00060 | 14,633 |        | 101.6 | 428,149 | +1 | 600 |

[1] Negative values signify shrinkage; positive values, expansion.

The structural characteristics of the film are tabulated below:

| Example | Apparent Density at 25° C. (gms./cc.) | Crystallite Length (A.) | Long Period Spacing (A.) | Amorphous Length (A.) | Angle "α" (degrees) |
| --- | --- | --- | --- | --- | --- |
| 20 | 1.3888 | 62 | 132 | 70 | 36.3 |
| 21 | 1.3904 | 58 | 132 | 74 | 32.5 |
| 22 | 1.3862 | 64 | 134 | 70 | 37.1 |
| 23 | 1.3875 | 55 | 131 | 76 | 33.3 |

For certain end uses, such as in electrical insulation, wherein it is desired to have the film shrink during application an appreciable extent in one direction, it is advantageous to perform the unidirectional stretch and not employ the heat setting step following the unidirectional stretch. In such a case, stretching temperatures in the neighborhood of 80° to 110° C. are advantageous. For other uses, where it is desired to reduce thermal dimensional stability to a minimum, the film could be allowed to relax in the longitudinal direction during or after heat setting, the latter as disclosed in U.S. Patent 2,779,684.

In the above examples, tensile strength was measured on an Instron tensile testing machine (Model TT-B, Instron Engineering Co., Quincy, Massachusetts) using a sample length of 2 inches (between the jaws of the machine) and a width of 1 inch and elongating at a rate of 100% minute. This machine produces a load-elongation chart from which may be calculated the tensile strength (tenacity or breaking strength), the modulus (elastic modulus or stiffness) and elongation (maximum elongation). The tensile strength and modulus are expressed in terms of force per area based on the cross-sectional area of the film prior to unidirectional stretching.

The tear strength (tear resistance) is the force required to tear the film in either direction as measured in grams per mil of film thickness. In the above examples, tear strength was measured on an Elmendorf Tear Tester (Albert Instrument Corp., Philadelphia, Pennsylvania). This device has a stationary jaw, a movable jaw mounted on a pendulum which swings on a frictionless bearing, and a means for registering the maximum arc through which the pendulum swings. The film sample is placed between the jaws and the pendulum released. The point at which the pendulum stops after tearing the film is recorded and the tear strength calculated therefrom.

The stress-flex test is a quantitative mechanical adaptation of the hand flex test wherein a sheet of film is grasped with a gap of 2–3 inches between the hands and by alternate upward and downward movement of the hands the film is flexed until it breaks. In the stress-flex test, samples 4″ x 7″, the latter dimension in the longitudinal direction, are first conditioned at 24° C. and 35% relative humidity for at least 24 hours. After conditioning, a sample is inserted between rubber-faced clamps, one movable and one stationary, with the 7 inch dimension parallel to the clamps, the movable clamp being in the extreme forward position and the assembly substantially horizontal. The movable clamp is weighted to provide a total weight of 1.5 pounds and is driven by a motor through a suitable gear arrangement. The clamps are spaced ⅞ inch from each other. After tightening the clamps, the movable clamp is moved as far to the rear as possible, the excess film drooping in a smooth curve between the clamps. The sample should be centered and free from any obvious tensions or buckles. The motor is then started and the movable clamp moves alternately forward and rearward at a rate of 72 cycles/minute. The number of cycles before the films tears divided by the thickness of the film in mils is the stress-flex value.

The process of this invention is useful in preparing a film of superior properties. This novel film may also be prepared by the process disclosed in copending application Serial No. 837,601, filed September 2, 1959, now issued as U.S. Patent No. 2,975,484, which is a continuation-in-part of application Serial No 629,456, filed December 20, 1956, to L. E. Amborski, now abandoned, and by a process within the disclosure of copending application Serial No. 798,830, filed March 12, 1959, to F. R. Winter, now issued as U.S. Patent No. 2,995,779.

The film is highly useful for such applications as a base support in magnetic recording films and tapes, as a dielectric in a wide variety of electrical applications, e.g., insulation in motors, transformers, wires, cables, capacitors, etc., as a plastic glazing material, as a construction material for transparent containers, piping and bottle closures, as a packaging material, a typewriter ribbon, conveyor belt, in metallic yarn, miscellaneous (laminated) tapes, measuring tapes, tear tapes, linear scales, etc.

An advantage of the process of this invention is that it produces a film having unique directional properties. Another advantage is that the process can be continuously and controllably performed on conventional stretching equipment, of the types disclosed in Alles and Heilman U.S. Patent No. 2,728,941 and the aforementioned Scarlett patent.

What is claimed is:
1. An asymmetrically biaxially oriented polyethylene terephthalate film which is non-fibrillating, which has a unidirectional tensile strength of 30,000–113,000 p.s.i., a unidirectional tensile strength (measured at 5% elongation) of 20,000–75,000 p.s.i., a unidirectional initial tensile modulus of 700,000–1,500,000 p.s.i., a unidirectional elongation no greater than 50%, and which has a thermal dimensional stability at 150° C. of less than 10%.

2. An asymmetrically biaxially oriented polyethylene terephthalate film composed of a network of crystalline and amorphous regions having an apparent density of 1.37–1.40 grams/cc. at 25° C., the average crystallite length being 50–75 Angstrom units, the average amorphous length being 65–110 Angstrom units, the sum of crystallite length and amorphous length being 125–160 Angstrom units, the weighted average distribution of the long axes of the crystallites being within an angle of 30–45° from the direction of greater orientation and the thermal dimensional stability at 150° C. being less than 15%.

3. An asymmetrically biaxially oriented polyethylene terephthalate film composed of a network of crystalline and amorphous regions having an apparent density of 1.37–1.40 grams/cc. at 25° C., the average crystallite length being 50–75 Angstrom units, the average amorphous length being 65–110 Angstrom units, the sum of crystallite length and amorphous length being 130–150 Angstrom units, the weighted average distribution of the long axes of the crystallites being within an angle of 30–45° from the direction of greater orientation and the thermal dimensional stability at 150° C. being less than 15%.

4. An asymmetrically biaxially oriented polyethylene terephthalate film composed of a network of crystalline and amorphous regions having an apparent density of 1.37–1.40 grams/cc. at 25° C., the average crystallite length being 55–65 Angstrom units, the average amorphous length being 65–110 Angstrom units, the sum of crystallite length and amorphous length being 125–160 Angstrom units, the weighted average distribution of the long axes of the crystallites being within an angle of 30–45° from the direction of greater orientation and the thermal dimensional stability at 150° C. being less than 15%.

5. An asymmetrically biaxially oriented polyethylene terephthalate film which is non-fibrillating, which has a unidirectional tensile strength (measured at 5% elongation) of 20,000–75,000 p.s.i., and which has a thermal dimensional stability at 150° C. of less than 15%.

6. An asymmetrically biaxially oriented polyethylene terephthalate film which is non-fibrillating, which has a unidirectional tensile strength of 30,000–113,000 p.s.i. a unidirectional tensile strength (measured at 5% elongation) of 20,000–75,000 p.s.i., a unidirectional initial tensile modulus of 700,000–1,500,000 p.s.i., a unidirectional elongation no greater than 50%, and which has a thermal dimensional stability at 150° C. of less than 15%.

References Cited by the Examiner
UNITED STATES PATENTS

| | | | |
|---|---|---|---|
| 2,719,100 | 9/55 | Banigan | 156—229 XR |
| 2,851,733 | 9/58 | Pangonis. | |
| 2,975,484 | 3/61 | Amborski. | |

EARL M. BERGERT, *Primary Examiner.*

CARL F. KRAFFT, *Examiner.*